Patented Apr. 22, 1941

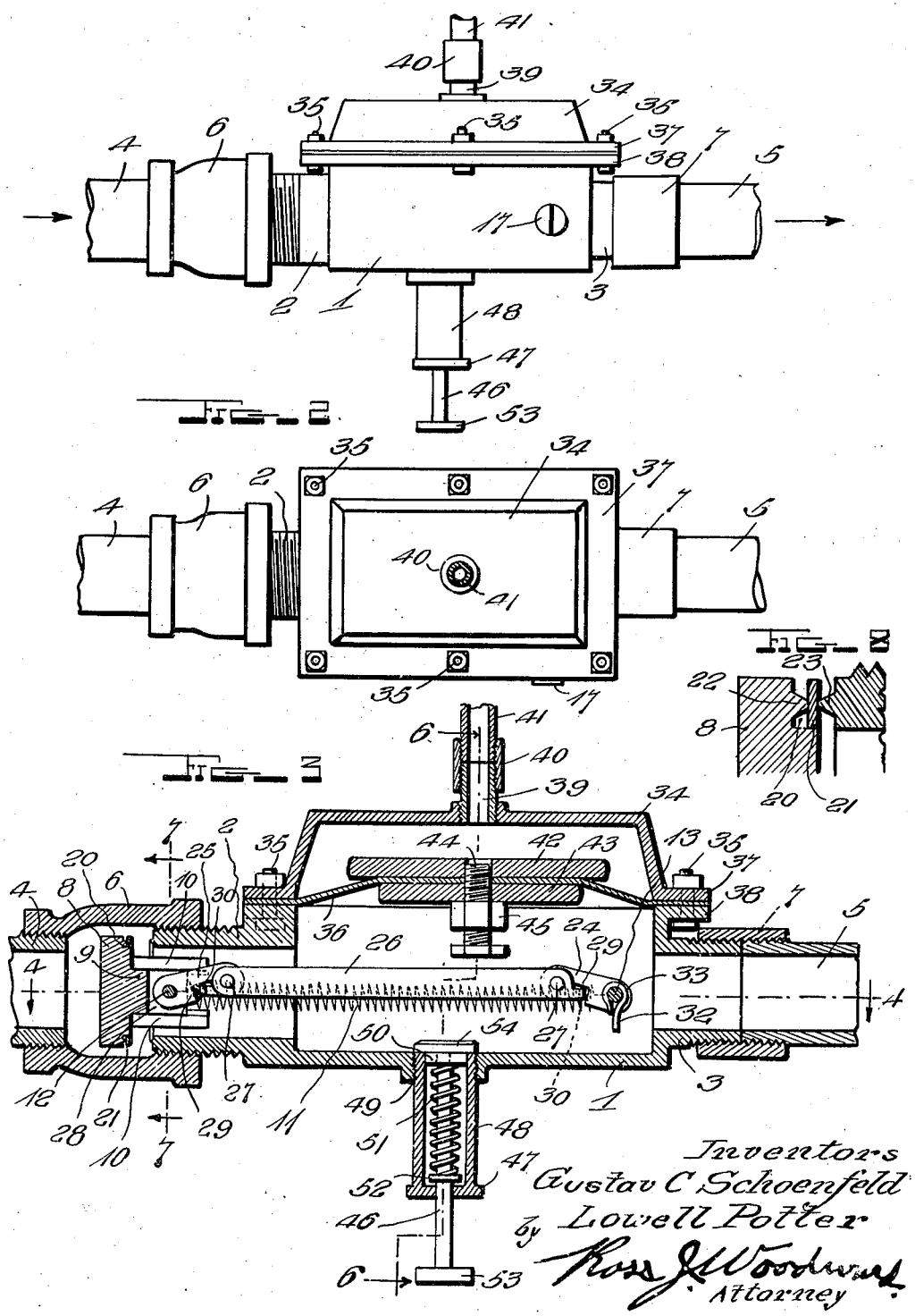

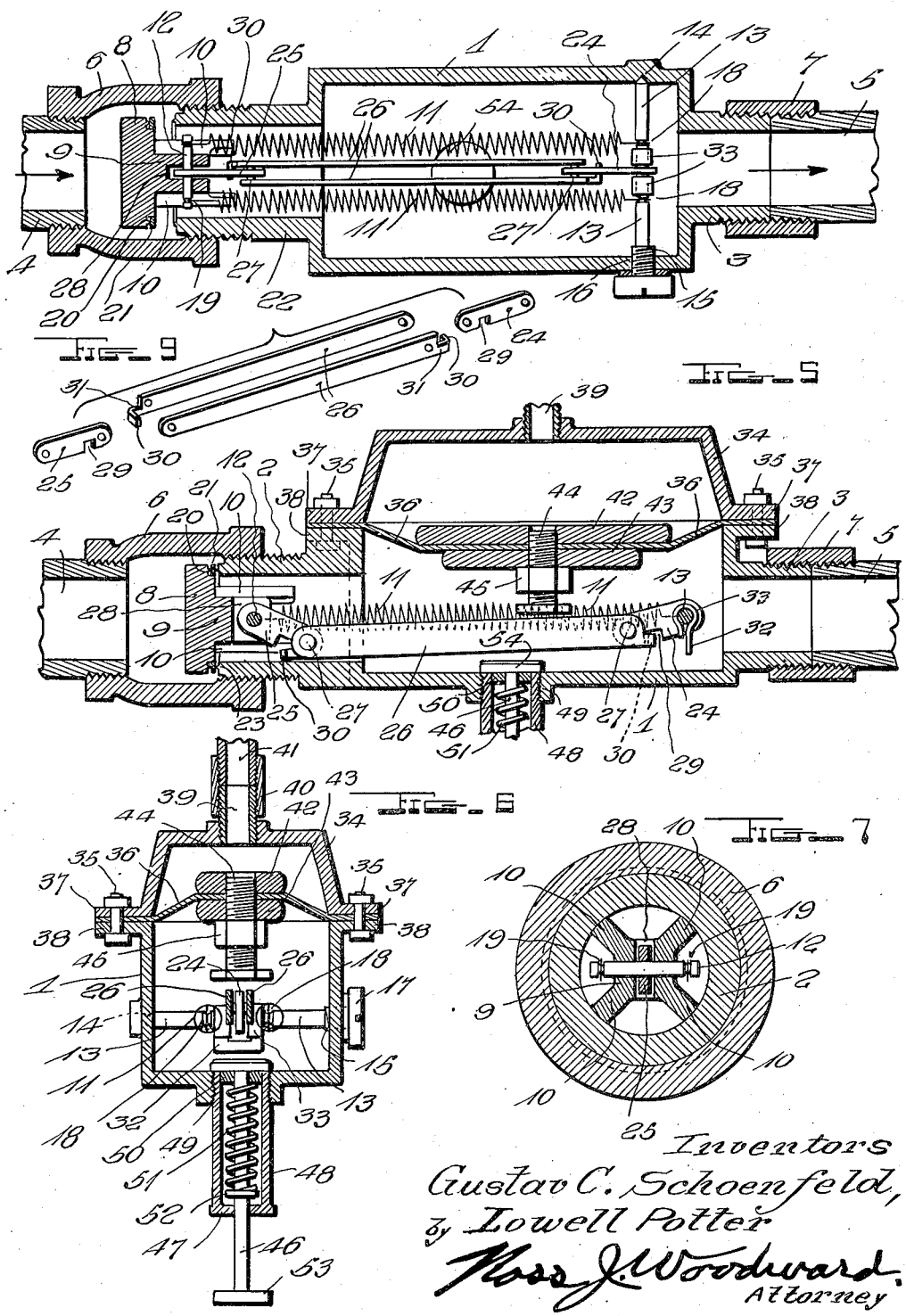

2,239,254

UNITED STATES PATENT OFFICE 2,239,254

AUTOMATIC CUTOFF VALVE

Gustav C. Schoenfeld and Lowell Potter,
Great Falls, Mont.

Application February 5, 1940, Serial No. 317,448

3 Claims. (Cl. 137—153)

This invention relates to valves and more particularly to an automatic cutoff valve adapted for use in a pipe line through which gas or other fluids flow under pressure.

One object of the invention is to provide a valve of this character so constructed that under normal conditions, fluid will flow through the valve, the valve being automatically closed when fluid pressure drops during interruption of flow of the fluid through the pipe line and remaining closed until the valve is manually opened. It will thus be seen that if flow of gas through a pipe line is interrupted and then restored, escape of unburned gas through a pilot light or other automatic gas appliance will be prevented.

Another object of the invention is to provide a valve wherein the closure or valve head is connected with a toggle link structure adapted to be moved to a position holding the valve head opened by a manually actuated device, a diaphragm being mounted over the toggle link structure and carrying a weight for tripping the toggle link structure and allowing closing of the valve head when pressure is reduced and the diaphragm and the weight move downwardly.

Another object of the invention is to provide a valve wherein the shank of the valve head or closure is slidably received in the inlet neck of the valve casing and guides movement of the valve head into and out of closed position, said valve head being urged toward closed position by springs and connected with a toggle structure serving to maintain the valve head in open position when properly set.

Another object of the invention is to provide an automatic valve which is simple in construction, cheap to manufacture, and not liable to get out of order and fail to operate properly.

The invention is illustrated in the accompanying drawings, wherein:

Fig. 1 is a side elevation of the improved valve.

Fig. 2 is a top plan view of the valve.

Fig. 3 is a vertical sectional view taken longitudinally through the improved valve, the valve head being in open position.

Fig. 4 is a longitudinal horizontal sectional view taken on the line 4—4 of Fig. 3.

Fig. 5 is a view similar to Fig. 3, showing the valve head closed.

Fig. 6 is a transverse sectional view taken on the line 6—6 of Fig. 3.

Fig. 7 is a transverse sectional view on the line 7—7 of Fig. 3.

Fig. 8 is a fragmentary sectional view on an enlarged scale of a portion of the valve head and the valve seat.

Fig. 9 is a group view showing in perspective the links and strips forming the toggle connection for the valve head.

This improved valve has a casing 1 which is preferably oblong but may be of other specific shapes if desired. At one end the casing carries an outwardly projecting inlet neck 2 while from its other end projects an outlet neck 3. These necks are connected with sections 4 and 5 of a pipe line by couplings 6 and 7 and attention is called to the fact that the coupling 6 also serves as a shield for a valve head or closure member 8 which is disposed externally of the inlet neck 2 and has a stem or shank 9 extending into the inlet neck. Ribs 10, which extend along the shank, project radially therefrom, as shown in Fig. 7, to engage walls of the inlet neck and guide sliding movement of the valve head, and since these ribs are spaced from each other circumferentially of the shank, they will not interfere with flow of gas or other fluid through the neck when the valve head is in open position.

In order to urge the valve head or closure toward closed position there have been provided springs 11 which extend longitudinally in the casing 1 in transverse spaced relation to each other and have eyes or loops at their front or outer ends engaged about protruding ends of a pin 12 passing transversely through the shank of the valve head. The inner or rear ends of the springs are also formed with eyes or loops engaged about a pin or rod 13 which passes transversely through the casing with one end engaged in a recess 14 formed in a side wall of the casing and its other end portion enlarged and threaded, as shown at 15, for engagement with threads of a threaded opening 16 formed in the other wall of the casing. This is clearly shown in Fig. 4, and from an inspection of this figure it will be readily seen that when the pin or rod is grasped by its head 17 and screwed tightly into place with its inner end seated in the recess 14, it will be firmly mounted and constitute a good anchoring rod for the springs. Annular grooves 18 are formed in the rod to receive eyes or loops at inner ends of the springs and maintain the springs in their proper spaced relation to each other and similar grooves 19 are formed about member 12 for receiving the loops on the opposite ends of the springs.

The springs are under tension to pull the valve head toward closed position and seat it against the outer end of the neck 2 which serves as a seat for the valve head. The inner end portion of the valve head is formed with an annular circumferentially extending recess 20 to receive a gasket 21 and confronting faces of the valve head and the valve seat are formed with opposed annular ribs 22 and 23 which have biting engagement with opposite faces of the gasket and eliminate danger of leakage when the valve head is in closed position.

In order to retain the valve head in open position after being opened, there has been provided a toggle structure consisting of short inner and outer links 24 and 25 pivotally mounted about the rod 13 and the pin 12, and elongated intermediate links or strips 26 extending between the end links longitudinally of the casing 1 and pivotally connected with the end links at opposite sides thereof by pins 27. A slot 28 is formed in the shank 9 to receive the link 25 and permit it to have pivotal movement about the pin 12. Notches 29 are formed in lower edges of the links 24 and 25 to receive lugs 30 projecting laterally from fingers or tongues 31 at ends of the strips, 26, and by comparing Figs. 3 and 5, it will be seen that while the end links may swing downwardly a sufficient distance to permit the valve head to be drawn to closed position by the springs when in the position shown in Fig. 5, upward swinging movement of the end links will be limited to the position shown in Fig. 3 by engagement of the lugs 30 in the notches 29 and a locking action takes place which will serve to maintain the end links at a slight upward incline and hold the valve head in open position. A metal clip 32, slotted from its upper end to form forks or tongues 33, is suspended from the rod 13 with its tongues looped about the rod at opposite sides of the link 24 and serving as spacers disposed between the link and the grooves 18 to prevent the link from sliding along the rod out of its proper position thereon.

A hood or cap 34 is removably secured on the casing 1 by bolts 35 and between the cap and the open upper end of the casing is a sheet of leather or other suitable flexible material constituting a diaphragm 36, marginal portions of which are clamped between the outstanding flanges 37 and 38 of the cap and the casing and serve as a gasket to form a sealed joint. A nipple 39 is threaded through the top of the cap or hood for engagement by a coupling 40 so that a tube or pipe 41 may be connected with the nipple and lead to a chimney or through a wall and prevent danger of gas filling a room or other portion of a building in which the valve is located, should a leak form through the diaphragm. This nipple and tube also serve as a vent to prevent formation of an air cushion over the diaphragm and interfering with upward movement of the diaphragm. Upper and lower metal plates 42 and 43 constituting weights are secured against the center portion of the diaphragm by a screw 44 threaded through alined openings formed in the plates and, in order to firmly secure the screw against working loose, there has been provided a nut 45 which abuts the under face of the lower plate and serves as a lock nut.

Under normal conditions, the valve head is open and gas may flow freely through the valve casing and the pipe line. The pressure of the gas acts upon the diaphragm to shift it upwardly and hold it in the raised position shown in Fig. 3. The toggle structure formed by the end links and the intermediate links or strips retains the valve head in open position and prevents the springs from drawing the valve head inwardly to closed position. If the flow of gas from the generator or city supply plant is temporarily shut off or the pressure reduced to such a point that a pilot light, gas heater or the like, is liable to be extinguished, the diaphragm will no longer be held in raised position and the weights will shift it downwardly. As the weights move downwardly, the head of the bolt 44 will make contact with upper edges of the links or strips 26 and the strips and end links will be shifted downwardly until they pass a dead center and allow the springs 11 to contract and draw the valve head to closed position. The valve will thus be closed and, when normal flow of gas is restored, the gas will be prevented from escaping through a gas burner or pilot light to which the pipe line leads. It is then necessary to manually restore the valve head to open position and, in order to do so, there has been provided a plunger 46 which is slidable vertically through the head 47 at the lower end of a tubular sleeve 48. This sleeve is screwed into an opening 49 formed through the bottom of the casing and, at its upper end, carries a head or abutment disc 50 serving as an abutment for the upper end of a spring 51. The spring 51 bears against the collar 52 and urges the plunger downwardly but, by placing a finger against the knob 53 at the lower end of the plunger, the plunger may be easily shifted upwardly to bring its head 54 into engagement with lower edges of the strips 26 and continued upward movement of the plunger will shift the strips upwardly and restore the strips and the end links to raised position in which the toggle structure will serve as means for holding the valve head in open position to which it has been moved as the strips are shifted upwardly past a dead center. Pressure upon the lower end of the plunger can then be removed and the spring 51 will restore it to the depressed position when the valve will remain open until lack of flow of gas at normal pressure through the valve casing again permits the weights to move downwardly and bring the bolt 44 into engagement with the strips to depress them and allow the springs to move the valve head to closed position. It will thus be seen that the valve may be automatically closed when flow of gas through the pipe line and valve casing at normal pressure fails and that manual operation is necessary to restore the valve head to open position.

Having thus described the invention, what is claimed is:

1. A valve comprising a casing defining a chamber and having an inlet at one end an an outlet neck at its other end, the inlet neck being provided with a valve seat, a valve head shiftable longitudinally of the inlet neck into and out of seated engagement with the valve seat, a transversely extending pin carried by said valve head, an anchor rod extending transversely through said chamber intermediate the inlet and the outlet, springs extending between and secured at their ends to the pin and the rod and constituting means for urging the valve head inwardly to closed position, a link pivoted to said pin, a second link pivoted to said rod, strips extending between the links and pivoted at their ends to the links for vertical movement past a dead center during opening and closing of the valve head, abutment fingers at ends of said strips for engaging said links and limiting pivotal movement of the links and strips when shifted upwardly to move the valve head in an opening direction whereby the valve head will be held open, pressure controlled means for automatically shifting the strips and the links to depressed position permitting closing of the valve head when pressure within the chamber is reduced below a predetermined point, and manually actuated means for restoring the strips and links to elevated position for opening the valve head and holding it in open position.

2. A valve comprising a casing having an inlet provided with a valve seat and an outlet, a valve head shiftable through the inlet from extended position to closed position against the valve seat, an anchor rod in said casing spaced from the inlet, a link pivoted to the valve head, a link pivoted to the anchor rod, strips extending between the links at opposite sides thereof and pivoted at their ends to the links for vertical movement past a dead center during opening and closing of the valve head, abutment fingers extending laterally from opposite ends of the strips for engaging lower edges of the links and limiting pivotal movement of the links and strips when shifted upwardly during opening of the valve head and thereby hold the valve head in open position, spring means for urging the valve head toward closed position and yieldably holding the links and strips in a shifted position, pressure controlled means for shifting the strips and links downwardly past a dead center to a depressed position allowing closing of the valve head when pressure in the casing is reduced beyond a predetermined point, and manually actuated means for restoring the strips and links to raised position and effecting opening of the valve head.

3. A valve comprising a casing having an inlet and an outlet, a valve head shiftable from extended position to retracted position for closing the inlet, spring means urging the valve head closed, a toggle structure for controlling opening and closing of the valve head including companion members pivoted in end to end engagement with each other, one end of the toggle structure being pivoted to the valve head and its other end being pivoted to a support in the body, the pivoted members being moved upwardly past a dead center during opening of the valve head and downwardly past a dead center during closing of the valve head, certain of the toggle forming members having abutments for engaging adjoining ends of companion members and limiting upward movement of the toggle structure whereby the valve head will be held in open position, pressure controlled means for shifting the toggle structure to a depressed position and allowing closing of the valve head when pressure in the casing is reduced below a predetermined point, and manually actuated means for restoring the toggle structure to raised position and effecting opening of the valve head.

GUSTAV C. SCHOENFELD.
LOWELL POTTER.